US009248595B2

(12) United States Patent
Schad et al.

(10) Patent No.: US 9,248,595 B2
(45) Date of Patent: Feb. 2, 2016

(54) HOT RUNNER APPARATUS FOR AN INJECTION MOLDING MACHINE

(71) Applicant: Athena Automation Ltd., Vaughan (CA)

(72) Inventors: Robert D. Schad, Vaughan (CA); Roberto Sicilia, Mississauga (CA)

(73) Assignee: ATHENA AUTOMATION LTD., Vaughan (CA)

( * ) Notice: Subject to any disclaimer, the term of this patent is extended or adjusted under 35 U.S.C. 154(b) by 0 days.

(21) Appl. No.: 14/748,592

(22) Filed: Jun. 24, 2015

(65) Prior Publication Data

US 2015/0367546 A1 Dec. 24, 2015

Related U.S. Application Data

(60) Provisional application No. 62/016,316, filed on Jun. 24, 2014.

(51) Int. Cl.
| B29C 45/23 | (2006.01) |
| B29C 45/27 | (2006.01) |
| B29C 45/74 | (2006.01) |
| B29C 45/28 | (2006.01) |
| B29C 49/06 | (2006.01) |

(52) U.S. Cl.
CPC ............ *B29C 45/2711* (2013.01); *B29C 45/23* (2013.01); *B29C 45/74* (2013.01); *B29C 45/2725* (2013.01); *B29C 45/2806* (2013.01); *B29C 49/06* (2013.01); *B29C 2045/2761* (2013.01)

(58) Field of Classification Search
CPC .. B29C 49/06; B29C 45/2806; B29C 45/2725

USPC .......................................... 425/533, 564, 572
See application file for complete search history.

(56) References Cited

U.S. PATENT DOCUMENTS

| 4,005,969 A | * | 2/1977 | Farrell | .................... B29C 49/44 |
| | | | | 425/533 |
| 4,312,630 A | | 1/1982 | Travaglini | |
| 4,622,001 A | | 11/1986 | Bright et al. | |
| 5,096,411 A | * | 3/1992 | Gellert | ................ B29C 45/2725 |
| | | | | 425/572 |
| 5,206,040 A | * | 4/1993 | Gellert | .................... B29C 45/27 |
| | | | | 425/572 |
| 5,254,305 A | | 10/1993 | Fernandez et al. | |
| 5,849,343 A | | 12/1998 | Gellert et al. | |
| 6,220,850 B1 | | 4/2001 | Catoen et al. | |
| 6,261,084 B1 | | 7/2001 | Schmidt | |
| 6,264,460 B1 | | 7/2001 | Wright et al. | |

(Continued)

FOREIGN PATENT DOCUMENTS

| CA | 1314370 | 3/1993 |
| EP | 0361045 | 4/1990 |

*Primary Examiner* — Tim Heitbrink
(74) *Attorney, Agent, or Firm* — Bereskin & Parr LLP/S.E.N.C.R.L., s.r.l.

(57) ABSTRACT

A hot runner apparatus for a mold assembly of an injection molding machine includes a hot runner plate assembly having a first end portion and a second end portion and a machine axis extending therebetween. At least one insert coupling having an axial bore is secured to the first end portion of the hot runner plate assembly, for separable sealed engagement with a gate insert affixed to a cold half of the mold assembly. The insert coupling includes a coupling interface for contacting a mating interface of the gate insert in sealed contact during an injection cycle of the injection molding machine. The coupling interface includes a primary side surface that is inclined relative to the machine axis.

17 Claims, 7 Drawing Sheets

(56) References Cited

U.S. PATENT DOCUMENTS

| | | |
|---|---|---|
| 6,398,542 B1 | 6/2002 | Romanski et al. |
| 6,422,857 B2 | 7/2002 | Wright et al. |
| 6,960,073 B2 | 11/2005 | Bazzo et al. |
| 7,025,585 B2 | 4/2006 | Gellert |
| 7,037,103 B2 | 5/2006 | Niewels |
| 7,223,092 B2 | 5/2007 | Fischer et al. |
| 7,467,940 B2 | 12/2008 | Bouti |
| 7,566,216 B2 | 7/2009 | Kmoch et al. |
| 7,798,806 B2 | 9/2010 | Neter et al. |
| 7,803,306 B2 * | 9/2010 | Babin ............. B29C 45/2703 425/572 |
| 8,182,261 B2 | 5/2012 | Neter et al. |
| 2004/0151937 A1 * | 8/2004 | Hutchinson ....... B29C 33/3828 425/533 |

* cited by examiner

HOT RUNNER APPARATUS FOR AN INJECTION MOLDING MACHINE

This application claims the benefit of Provisional Application Ser. No. 62/016,316, filed Jun. 24, 2015, which is hereby incorporated herein by reference.

FIELD

The disclosure relates to injection molding machines. More specifically, the disclosure relates to hot runner assemblies for injection molding machines, and inserts that may be incorporated in such assemblies.

BACKGROUND

U.S. Pat. No. 7,566,216 (Kmoch et al.) purports to disclose an injection molding machine including a nozzle assembly having a channel for conveying a fluid. At least one cavity insert is removably mounted within a cavity plate. The at least one cavity insert defines a mold cavity, and a first portion of a gate for communicating the fluid between the nozzle assembly and the mold cavity. A gate insert defines a receptacle for the nozzle assembly, and further defines a second portion of the gate. The gate insert is floatably retained between the nozzle assembly and the at least one cavity insert. Preferably, the gate insert is retained by a gate insert plate that is disposed between the cavity plate and the nozzle assembly.

U.S. Pat. No. 5,254,305 (Fernandez et al.) purports to disclose a nozzle for injecting a moldable material that has a nozzle body which defines a nozzle channel leading to the nozzle outlet. The nozzle outlet is controlled by an axially slidable nozzle pin extending coaxially through the nozzle channel. A guide sleeve slidably supports the nozzle pin until it reaches the region adjacent the nozzle outlet. As a result, the length along which the nozzle pin is exposed to the moldable material is significantly reduced, thereby substantially eliminating the bending stresses applied to the nozzle pin by the pressure asymmetries in the incoming moldable material. The nozzle pin may also be retracted fully within the guide sleeve to provide an unobstructed path for the moldable material to flow through and consolidate as it approaches the nozzle outlet. With this arrangement, the incoming moldable material may be conveyed towards the nozzle channel asymmetrically with respect to the axis of the nozzle pin without any deleterious effect.

U.S. Pat. No. 6,398,542 (Romanski et al.) purports to disclose a valve gating apparatus for injection molding including at least one shutter disposed between the gate and the cavity melt channel into a mold cavity. The shutter is removably fastened to a rail member. When the rail member is moved laterally, the shutter moves between a closed position wherein flow of melt from the nozzle into the cavity is inhibited, and an open position wherein flow of melt into the cavity is unimpeded by the shutter.

SUMMARY

The following summary is intended to introduce the reader to various aspects of the applicant's teaching, but not to define any invention.

According to some aspects of the Applicant's teaching disclosed herein, a hot runner apparatus for a mold assembly of an injection molding machine includes: (a) a hot runner plate assembly having a first end portion and a second end portion and a machine axis extending therebetween; (b) at least one insert coupling secured to the first end portion of the hot runner plate assembly for separable sealed engagement with a gate insert affixed to a cold half of the mold assembly, the at least one insert coupling having an axial bore extending therethrough and a coupling interface for contacting a mating interface of the gate insert in sealed contact during an injection cycle of the injection molding machine, the coupling interface including a primary side surface that is inclined relative to the machine axis; and (c) at least one nozzle assembly mounted to the hot runner plate assembly, the at least one nozzle assembly extending parallel to the machine axis and including a nozzle tip, the nozzle tip having a proximal portion received in the bore, and a distal portion extending proud of the insert coupling for engaging the gate insert during the injection cycle.

In some examples, the coupling interface can be free of any surface that both contacts the gate insert and is parallel to the machine axis. The coupling interface can include an insert coupling end face orthogonal to the machine axis. The primary side surface can provide the only lateral contact between the insert coupling and the gate insert.

In some examples, the insert coupling can include a first insert portion recessed within the hot runner plate assembly, and a second insert portion extending proud of the hot runner plate assembly. The second insert portion can include the primary side surface.

In some examples, the insert coupling can include a cylindrical side surface proximal to the primary side surface, and the cylindrical side surface can be spaced apart from adjacent surfaces of the gate insert during the injection cycle of the injection molding machine.

In some examples, the primary side surface can be frustoconical.

In some examples, the distal portion of the nozzle tip can include an insulator, and the insulator can include a radially outwardly extending insulator flange. The insert coupling can include a distal insert flange directed radially inwardly, and the insulator flange can be positioned axially immediate the distal insert flange and the proximal portion of the nozzle tip. The insert coupling can include a proximal insert flange for securing the insert coupling to the hot runner plate assembly.

According to some aspects, a mold gate apparatus for a mold assembly of an injection molding machine includes: (a) a nozzle tip extending parallel to a machine axis and comprising a proximal portion and a distal portion; (b) an insert coupling fixed relative to the nozzle tip and comprising a bore in which the proximal portion of the nozzle tip is received, the insert coupling comprising a primary side surface that is inclined with respect to the machine axis; and (c) a gate insert axially displaceable relative to the insert coupling, the gate insert having a seat surface directed towards the nozzle tip, a contact surface positioned proximally of the first surface, a cavity surface axially opposite the seat surface and forming a portion of a mold cavity, and a gate between the seat surface and the cavity surface, wherein during an injection cycle of the injection molding machine, the seat surface engages the distal portion of the nozzle tip such that the gate receives melt from the nozzle tip, and the contact surface contacts the primary side surface in sealed contact.

In some examples, the insert coupling can be free of any surface that both contacts the gate insert and is parallel to the machine axis. The gate insert can include an abutment surface orthogonal to the machine axis and extending between the seat surface and the contact surface. The insert coupling can include an insert coupling end face orthogonal to the machine axis for contacting the abutment surface in sealed contact during the injection cycle of the injection molding machine.

The contact between the contact surface and the primary side surface can provide the only lateral contact between the insert coupling and the gate insert.

In some examples, the insert coupling can include a cylindrical side surface proximal to the primary side surface, and the cylindrical side surface can be spaced apart from adjacent surfaces of the gate insert during the injection cycle of the injection molding machine.

BRIEF DESCRIPTION OF THE DRAWINGS

The drawings included herewith are for illustrating various examples of articles, methods, and apparatuses of the present specification and are not intended to limit the scope of what is taught in any way. In the drawings.

DETAILED DESCRIPTION

Various apparatuses or processes will be described below to provide an example of an embodiment of each claimed invention. No embodiment described below limits any claimed invention and any claimed invention may cover processes or apparatuses that differ from those described below. The claimed inventions are not limited to apparatuses or processes having all of the features of any one apparatus or process described below or to features common to multiple or all of the apparatuses described below. It is possible that an apparatus or process described below is not an embodiment of any exclusive right granted by issuance of this patent application. Any invention disclosed in an apparatus or process described below and for which an exclusive right is not granted by issuance of this patent application may be the subject matter of another protective instrument, for example, a continuing patent application, and the applicants, inventors or owners do not intend to abandon, disclaim or dedicate to the public any such invention by its disclosure in this document.

Figure 1A:
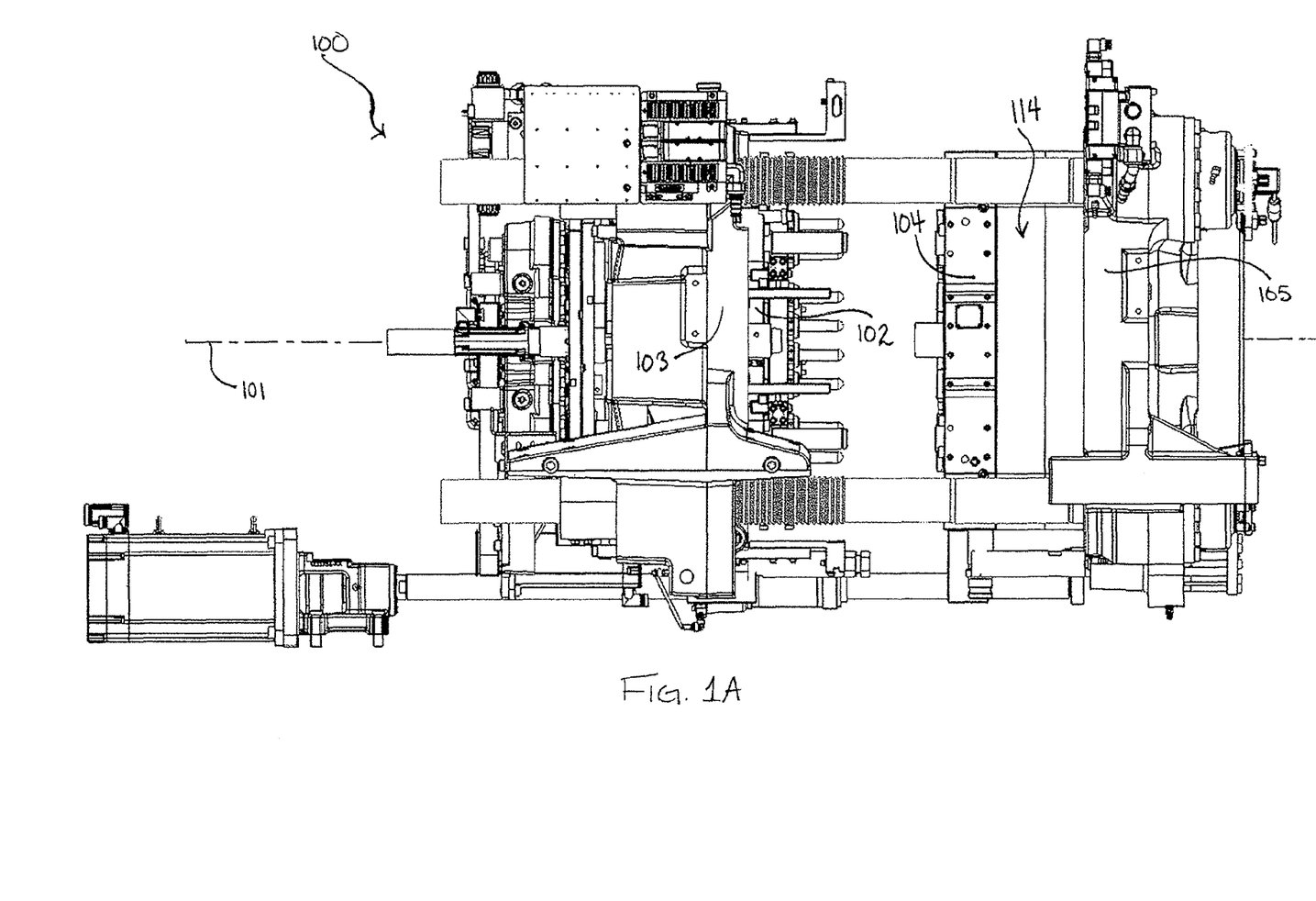
FIG. 1A is a side elevation view of an example clamp unit of an injection molding machine, shown in a mold open configuration.
Figure 1B:
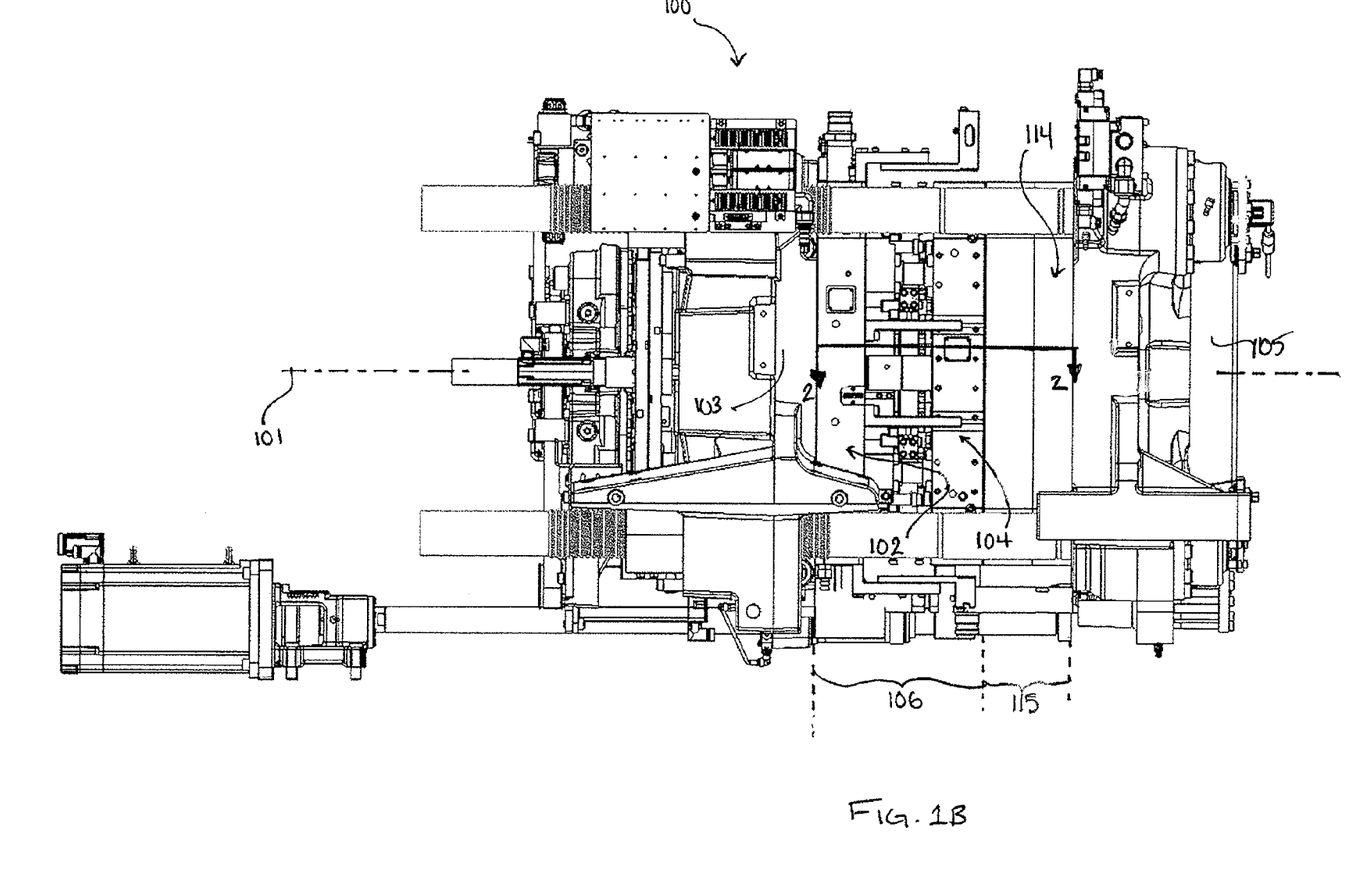
FIG. 1B is a side elevation view of the clamp unit of FIG. 1A, shown in a mold closed configuration.

Referring to FIGS. 1A and 1B, an example clamp unit 100 for an injection molding machine is shown. The clamp unit 100 includes, in the example illustrated, a moving platen 103 that is translatable along a machine axis 101 towards and away from a stationary platen 105. A core half 102 of a mold is mounted to the moving platen 103, and a cavity half 104 of the mold is attached to a hot runner apparatus 114 that is mounted to the stationary platen 105. The core half 102, cavity half 104, and hot runner apparatus form a mold assembly.

In FIG. 1A, the clamp unit 100 is shown in a mold-open configuration, in which the core half 102 is spaced apart from the cavity half 104 of the mold along the machine axis 101. During an injection cycle of the injection molding machine, the core half 102 is moved towards and engages the cavity half 104, as shown in FIG. 1B. Together, the core half 102 and cavity half 104 form a cold half 106 of the mold (shown in FIG. 1B).

Figure 2:
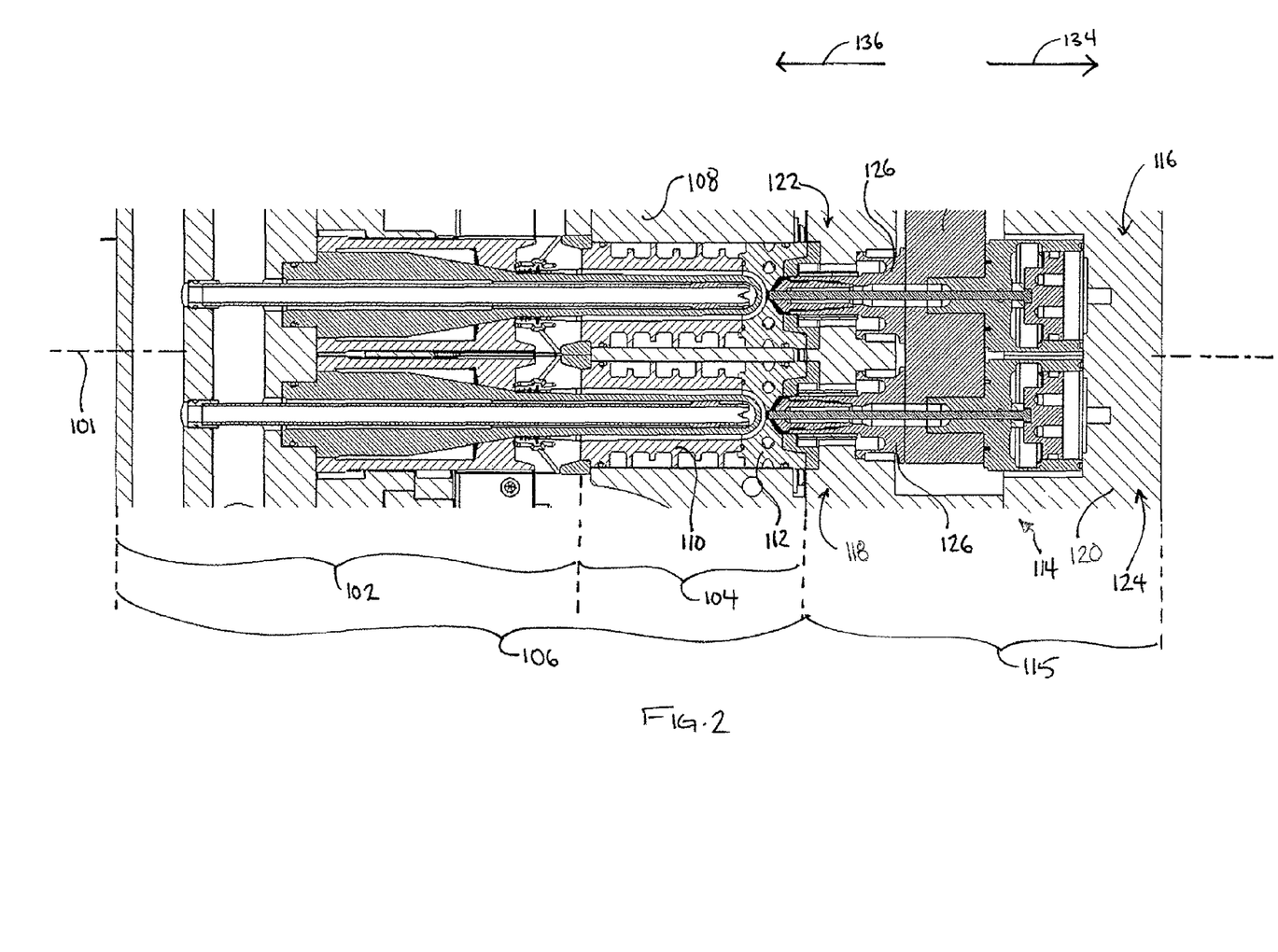
FIG. 2 is a cross section taken along line 2-2 in FIG. 1B, showing only two of the nozzle assemblies and two mold portions.

Referring to FIG. 2, in the example shown, the cavity half 104 includes a cavity plate 108, a cavity 110, and an at least one gate insert 112, described in further detail below.

Referring still to FIGS. 1A, 1B, and 2, the hot runner apparatus 114 forms a hot half 115 of the clamp unit 100. During the injection cycle of the injection molding machine, melt is injected into the mold via the hot runner apparatus 114.

Referring to FIG. 2, the hot runner apparatus 114 includes a hot runner plate assembly 116 that includes a hot runner nozzle plate 118 and a hot runner backing plate 120. The hot runner plate assembly 116 includes a first end portion 122 directed towards the mold, and an opposed second end portion 124. The machine axis 101 extends between the first end portion 122 and the second end portion 124.

At least one nozzle assembly may be mounted to the hot runner plate assembly. In the example shown, a plurality of nozzle assemblies 126 are mounted to the hot runner plate assembly 116, and each extends parallel to the machine axis 101. For simplicity, only one of the nozzle assemblies 126 will be described herein.

Figure 3A:
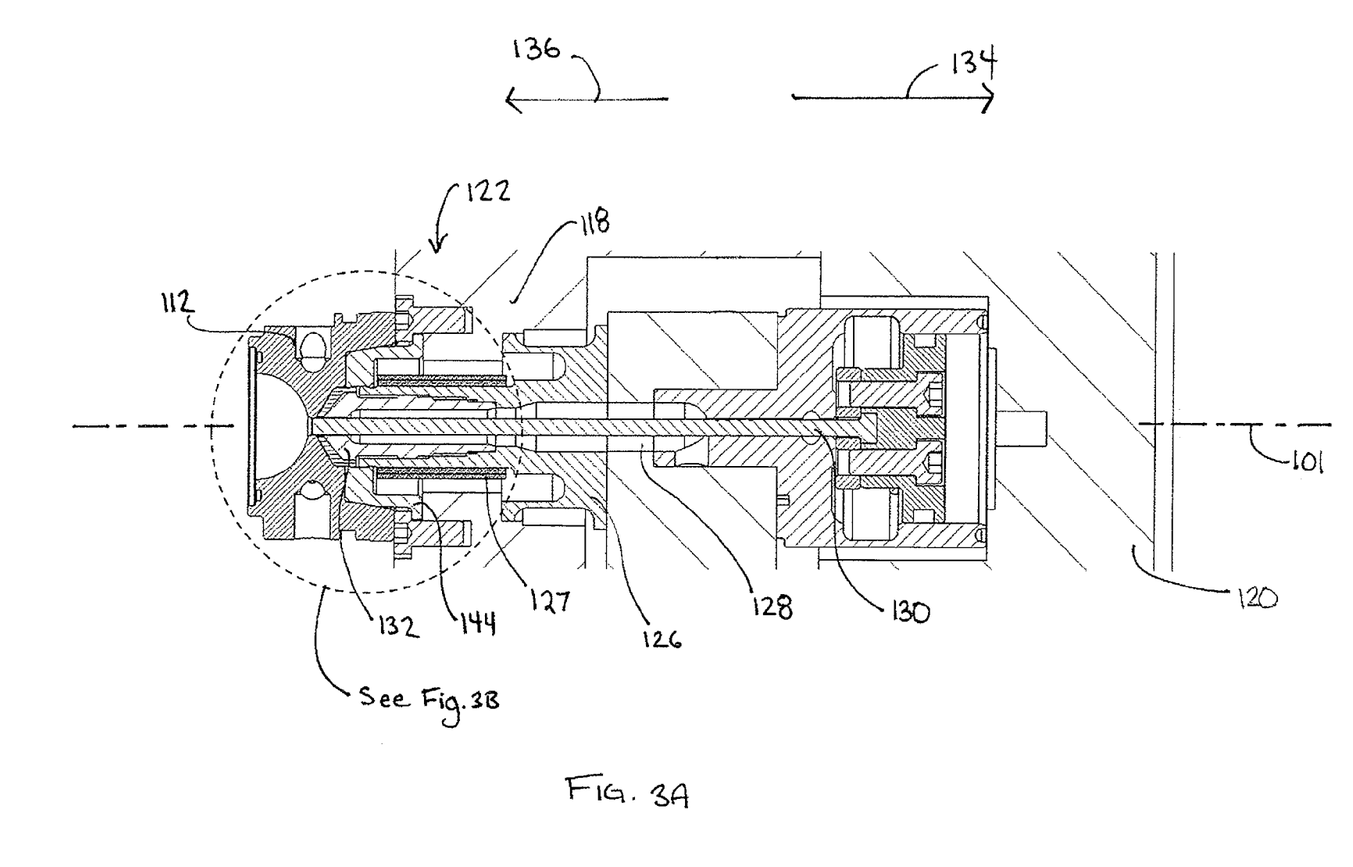
FIG. 3A is an enlarged view of one of the nozzle assemblies shown in FIG. 2, with a gate insert engaged with the nozzle assembly.
Figure 3B:
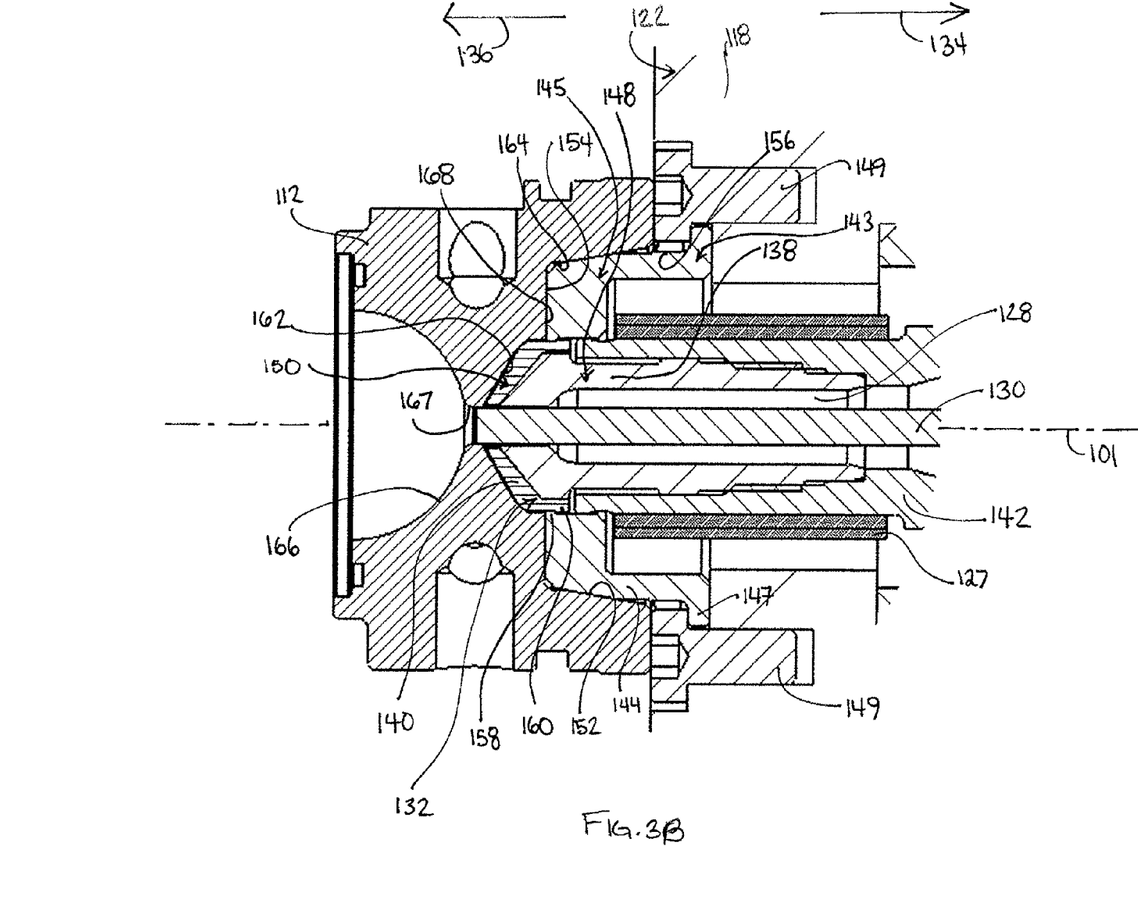
FIG. 3B is an enlarged view of circled region 3B in FIG. 3A.

Referring to FIGS. 3A and 3B, the nozzle assembly 126 is heated by a heater 127, and includes a melt flow channel 128, a valve stem 130, and a nozzle tip 132. During the injection cycle of the injection molding machine, the valve stem 130 is retracted in a proximal direction (indicated by arrow 134) to open the nozzle tip 132, and hot melt flows from the melt flow channel 128 out of the nozzle tip 132 and into the gate insert 112 of the mold. The valve stem 130 may be advanced in a distal direction (indicated by arrow 136) to close the nozzle tip 132.

Referring to FIG. 3B, in the example shown, the nozzle tip 132 includes a nozzle tip body 138, and an insulator 140 on the nozzle tip body. In some examples, the insulator may be made of a plastic sold under the brand name Vespel® (a polyimide). The nozzle tip 132 is mounted to a nozzle housing 142.

The hot runner apparatus 114 may include at least one insert coupling. In the example shown, the hot runner apparatus 114 includes a plurality of insert couplings 144. For simplicity, only one of the insert couplings will be described.

Figure 5:
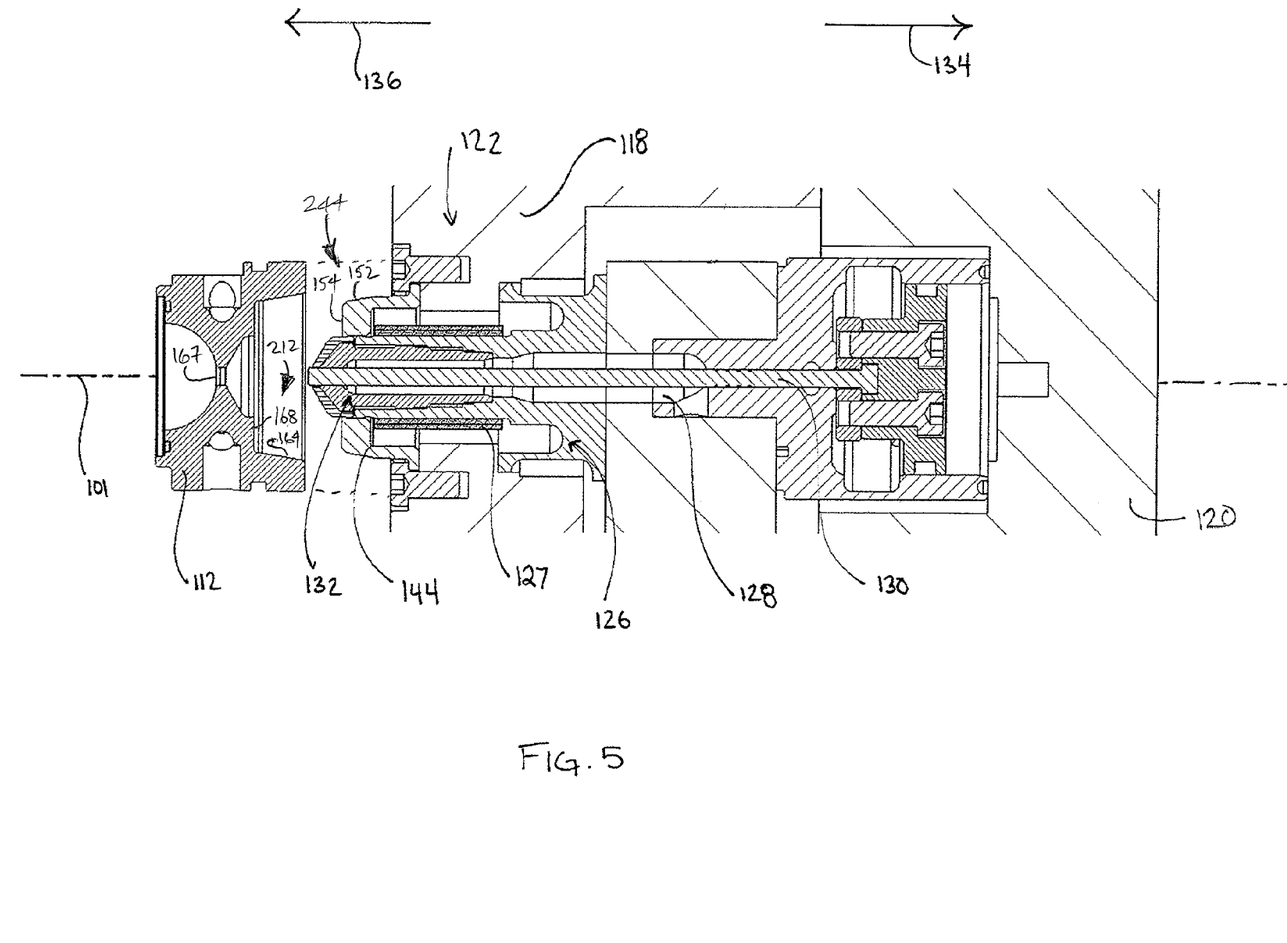
FIG. 5 is a partially exploded view of the nozzle assembly and gate insert of FIG. 3A.

Each insert coupling 144 has a coupling interface 244 for contacting a mating interface 212 of the gate insert 112 (see FIG. 5). As described in greater detail hereinafter, the coupling interface 244 is configured to contact the mating interface 212 in sealed contact during in injection cycle of the injection molding machine.

Referring still to FIG. 3B, the insert coupling 144 is secured to the first end portion 122 of the hot runner plate assembly 116, and is fixed relative to the nozzle tip 132. In the example shown, the first end portion 122 of the hot runner plate assembly 116 includes a counterbore, and the insert coupling 144 is partially received in the counterbore, so that a first insert portion 143 is recessed within the hot runner plate assembly 116. A second insert portion 145 extends proud of the hot runner plate assembly 116. The first insert portion 143 includes a proximal insert flange 147 that is secured to the hot runner plate assembly 116 by shoulder bolts 149, which are received in bolt-holes 151 in the flange 147.

In alternative examples, the hot runner plate assembly may have a generally flat face without counterbores, and the insert coupling may be secured in flush engagement with the face so that no portion of the insert coupling is recessed within the hot runner plate assembly.

Figure 4A:
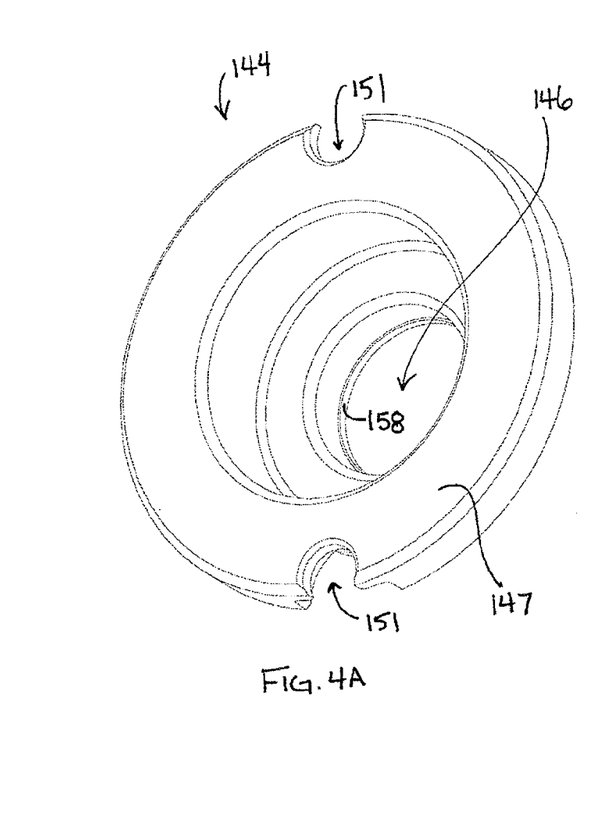
FIG. 4A is a rear perspective view of the insert coupling shown in FIGS. 2 to 3B.
Figure 4B:
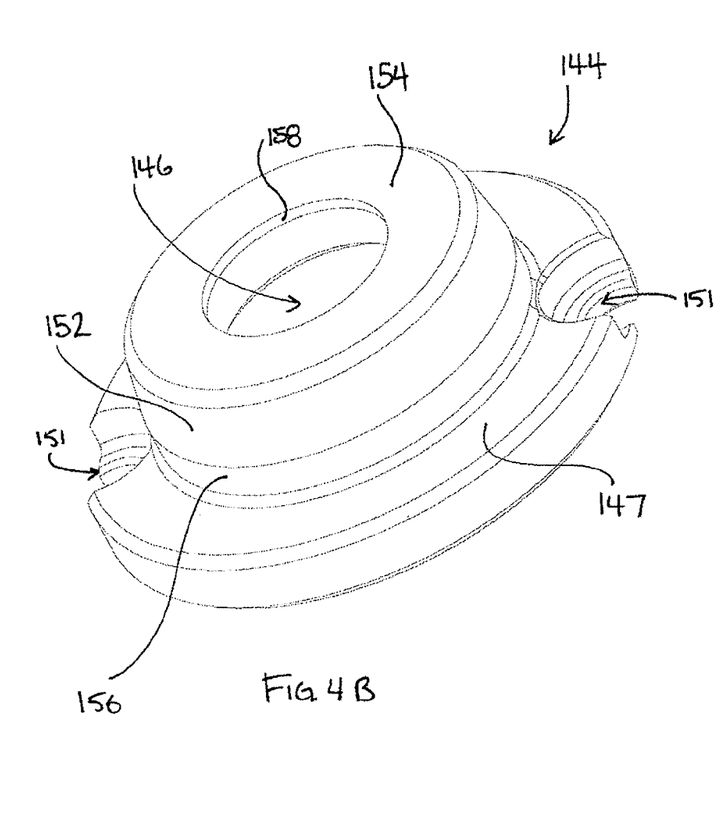
FIG. 4B is a front perspective view of the insert coupling shown in FIGS. 2 to 3B.

Referring also to FIGS. 4A and 4B, the insert coupling 144 has an axial bore 146 extending therethrough. In the example shown, the axial bore 146 has a stepped inner profile with different diameters along its length. In alternative examples, the axial bore may have a constant diameter.

Referring again to FIG. 3B, the nozzle tip 132 is received in the bore 146. Specifically, in the example shown, the nozzle tip 132 includes a proximal portion 148 located axially within the bore 146, and a distal portion 150 extending proud of the insert coupling 144, for engaging the cold half 106 of the clamp unit 100 during an injection cycle.

Referring to FIGS. 4A and 4B, the insert coupling 144 has a radially outer surface that includes a primary side surface 152. The primary side surface 152 forms at least a portion of the coupling interface 244. In the example illustrated, the primary side surface 152 provides sealed, lateral contact with the gate insert of the cold half 106 of the clamp unit 100 during an injection cycle of the injection molding machine. In this regard, lateral contact refers to contact between the gate insert and insert coupling that inhibits relative movement between these two elements in a direction orthogonal to the axis 101.

The primary side surface 152 may be inclined with respect to the machine axis 101. The primary side surface 152 may converge towards the axis 101 when moving along the axis 101 in the distal direction 136 (i.e. in a direction towards the cold half 106). The primary side surface 152 may be at an angle between 0 degrees and 90 degrees with respect to the machine axis 101. In some examples, the primary side surface 152 may be at an angle of between about 2 degrees and 88 degrees with respect to the machine axis 101. In some examples, the primary side surface 152 may be at an angle of between about 5 degrees and about 45 degrees with respect to the machine axis 101. In some examples, the primary side surface 152 may be at an angle of between about 5 degrees and about 15 degrees with respect to the machine axis 101.

In the example shown, the primary side surface 152 is a part of the second insert portion 145, and is not recessed within the hot runner plate assembly 116. In alternative examples, a portion of the primary side surface may be recessed within the hot runner plate assembly 116.

In the example shown, the primary side surface 152 is a single continuous surface that is generally frustoconical. In alternative examples, the primary side surface may be another shape, such as frustopyramidal.

Referring still to FIGS. 4A and 4B, in the example shown, the insert coupling 144 further includes an insert coupling end face 154 that is generally orthogonal to the machine axis 101, and extends radially inwardly from a distal end (i.e. the narrower diameter end) of the primary side surface 152. In the example illustrated, the end face 154 forms another portion of the coupling interface 244. The outer surface of the insert coupling 144 also includes, in the example illustrated, a cylindrical side surface 156 that is parallel to the machine axis 101, and is proximal to (and extends axially from the larger diameter end of) the primary side surface 152. The proximal insert flange 147 extends radially outwardly from the cylindrical side surface 156.

Referring to FIGS. 4A and 3B, the insert coupling 144 further includes a distal insert flange 158 that is positioned axially adjacent the end face 154 and is directed radially inwardly from the inner surface of the bore towards the axis 101. The insulator 140 includes an insulator flange 160 directed radially outwardly. The distal insert flange 158 is positioned distally of the insulator flange 160, and engages the insulator flange 160, to aid in retaining the insulator on the nozzle tip body 138. In the example illustrated, the insulator flange 160 is positioned axially intermediate the distal insert flange 158 and the proximal portion 148 of the nozzle tip 132.

Referring still to FIG. 3B, in the example shown, the gate insert 112 is generally of unitary, one-piece annular construction and mounted coaxially about the machine axis 101. A first end of the gate insert 112 is directed towards the hot runner plate assembly 116, and the second end is axially opposite the first end and directed towards the cold half of the mold. A gate 167, in the form of an aperture, extends through the gate insert 112, along the axis 101 and between the first and second ends of the gate insert 112.

The first end of the gate insert includes a seating surface 162 directed towards the nozzle tip 132. In the example illustrated, the seating surface 162 extends radially outward from the gate 167 and axially towards the hot runner plate assembly 116, forming a pocket in which the insulator 140 of the nozzle tip 132 is seated.

Furthermore, the first end of the gate insert 112 includes an abutment surface 168 that is, in the example illustrated, an annular surface oriented generally orthogonally to the machine axis 101 and which extends radially outwardly from the seating surface 162. A contact surface 164 is positioned proximally of the seating surface 162. In the example illustrated, the contact surface 164 extends from the radially outer edge of the abutment surface 168. At least portions of the abutment surface 168 and/or the contact surface 164 may form portions of the mating interface 212 of the gate insert 112 for contacting the coupling interface 244 of the insert coupling 144. This contact provides a sealed interface between the gate insert 112 and the insert coupling 144 and can facilitate leak-free flow of the melt from the melt flow channel into the molded article cavity via the gate 167.

The second end of the gate insert 112 includes a cavity surface 166 axially opposite the seating surface 162 and forming a portion of the molded article cavity. The gate 167 is formed in the gate insert 112 between the seating surface 162 and the molder article surface 166.

During an injection cycle of the injection molding machine, the seating surface 162 of the gate insert 112 engages the distal portion 150 of the nozzle tip 132. In the example shown, the insulator 140 of the nozzle tip 132 contacts the seating surface 162, and the melt flow channel 128 is aligned with the gate 137. This can facilitate the gate receiving melt from the nozzle tip 132.

Furthermore, during the injection cycle, the contact surface 164 of the gate insert is in sealed, lateral contact with the primary side surface 152 of the insert coupling 144. This contact between the primary side surface 152 and the contact surface 164 forms at least a portion of a sealed interface between the insert coupling 144 and the gate insert 112. In the example illustrated, this sealed interface further includes contact between the end face 154 of the insert coupling 144 and the abutment surface 168 of the gate insert 112.

In the example shown, the contact between the contact surface 164 and the primary side surface 152 is the only lateral contact provided by the sealed interface between the insert coupling 144 and the cold half 106. In other words, the seal interface includes no other mating inclined surfaces, nor any mating surfaces that are parallel to the machine axis 101.

In alternative examples, the seal interface between the insert coupling and the gate insert may include one or more additional inclined surfaces. For example, the coupling interface of the insert coupling may include a secondary side surface that is inclined with respect to the machine axis at a different angle than the primary side surface, and that is proximal to the primary side surface. The secondary side surface may contact a respective surface of the gate insert.

In the example shown, the coupling interface 244 is free of any surface that both contacts the gate insert 112 and is parallel to the machine axis 101. For example, the cylindrical side surface 156 of the insert coupling 144 is parallel to the machine axis, but does not contact (i.e. is spaced apart from) adjacent surfaces of the gate insert 112 during the injection cycle of the injection molding machine, as can be seen in FIG. 3B.

In use, molded articles are formed by pushing melt into the molded article cavities through the gate under high pressure. The surfaces 152 and 154 of the coupling interface 244 of the insert coupling 144 contact the surfaces 164 and 168, respectively, of the mating interface 212 of the gate insert 112. Because during normal operation the insert coupling 144 (attached to the hot half) is at a significantly higher temperature than the gate insert 112 (which is attached to the cold half), the insert coupling expands relative to the gate insert, pressing the primary side surface 152 and/or end face 154 of the insert coupling 144 against the mating surfaces (i.e. the contact surface 164 and/or abutment surface 168, respectively) of the gate insert 112. This can enhance the effectiveness of the seal interface between the surfaces.

After operating for a length of time, the cavity half may need to be separated from the hot runner apparatus, for example for mold maintenance or to change the molds. FIG. 5 shows the gate insert 112 removed from the nozzle assembly 126. By providing the insert coupling 144 with a primary side surface 152 that is inclined with respect to the machine axis 101, a gap is created between the mating surfaces of the insert coupling 144 and the cold half 106 in the radial direction as soon as the cold half 106 is moved in the axial direction even only slightly away from the hot half 115. This can facilitate separating the cold half 106 from the hot half 115 while the hot half 115 is still hot, without significantly scraping, scoring, or otherwise damaging the surfaces of the coupling interface 244 or the mating interface 212 that form the seal interface between the insert coupling 144 and the insert gate 112. This can speed up the maintenance or mold change process, and help preserve the integrity of the seal interface.

In the present application, the gate insert, nozzle tip, and insert coupling may be collectively referred to as a "mold gate assembly".

While the above description provides examples of one or more processes or apparatuses, it will be appreciated that other processes or apparatuses may be within the scope of the accompanying claims.

The invention claimed is:

1. A hot runner apparatus for a mold assembly of an injection molding machine, comprising:
   a) a hot runner plate assembly having a first end portion and a second end portion and a machine axis extending therebetween;
   b) at least one insert coupling secured to the first end portion of the hot runner plate assembly for separable sealed engagement with a gate insert affixed to a cold half of the mold assembly, the at least one insert coupling having an axial bore extending therethrough and a coupling interface for contacting a mating interface of the gate insert in sealed contact during an injection cycle of the injection molding machine, the coupling interface including a primary side surface that is inclined relative to the machine axis; and
   c) at least one nozzle assembly mounted to the hot runner plate assembly, the at least one nozzle assembly extending parallel to the machine axis and including a nozzle tip, the nozzle tip having a proximal portion received in the bore, and a distal portion extending beyond the insert coupling for engaging the gate insert during the injection cycle.

2. The hot runner apparatus of claim 1, wherein the coupling interface is free of any surface that both contacts the gate insert and is parallel to the machine axis.

3. The hot runner apparatus of claim 1, wherein the coupling interface further comprises an insert coupling end face orthogonal to the machine axis.

4. The hot runner apparatus of claim 1, wherein the primary side surface provides the only lateral contact between the insert coupling and the gate insert.

5. The hot runner apparatus of claim 1, wherein the insert coupling comprises a first insert portion recessed within the hot runner plate assembly, and a second insert portion extending proud of the hot runner plate assembly.

6. The hot runner apparatus of claim 5, wherein the second insert portion comprises the primary side surface.

7. The hot runner apparatus of claim 1, wherein the insert coupling further comprises a cylindrical side surface proximal to the primary side surface, wherein the cylindrical side surface is spaced apart from adjacent surfaces of the gate insert during the injection cycle of the injection molding machine.

8. The hot runner apparatus of claim 1, wherein the primary side surface is frustoconical.

9. The hot runner apparatus of claim 1, wherein the distal portion of the nozzle tip comprises an insulator, the insulator including a radially outwardly extending insulator flange, and the insert coupling comprises a distal insert flange directed radially inwardly, wherein the insulator flange is positioned axially immediate the distal insert flange and the proximal portion of the nozzle tip.

10. The hot runner apparatus of claim 1, wherein the insert coupling comprises a proximal insert flange for securing the insert coupling to the hot runner plate assembly.

11. A mold gate apparatus for a mold assembly of an injection molding machine, the mold gate assembly comprising:
   a) a nozzle tip extending parallel to a machine axis and comprising a proximal portion and a distal portion;
   b) an insert coupling fixed relative to the nozzle tip and comprising a bore in which the proximal portion of the nozzle tip is received, the insert coupling comprising a primary side surface that is inclined with respect to the machine axis; and
   c) a gate insert axially displaceable relative to the insert coupling, the gate insert having a seat surface directed towards the nozzle tip, a contact surface positioned proximally of the first surface, a cavity surface axially opposite the seat surface and forming a portion of a mold cavity, and a gate between the seat surface and the cavity surface, wherein during an injection cycle of the injection molding machine, the seat surface engages the distal portion of the nozzle tip such that the gate receives melt from the nozzle tip, and the contact surface contacts the primary side surface in sealed contact.

12. The mold gate apparatus of claim 11, wherein the insert coupling is free of any surface that both contacts the gate insert and is parallel to the machine axis.

13. The mold gate apparatus of claim 11, wherein:
a) the gate insert comprises an abutment surface orthogonal to the machine axis and extending between the seat surface and the contact surface; and
b) the insert coupling comprises an insert coupling end face orthogonal to the machine axis for contacting the abutment surface in sealed contact during the injection cycle of the injection molding machine.

14. The mold gate apparatus of claim 11, wherein the contact between the contact surface and the primary side surface provides the only lateral contact between the insert coupling and the gate insert.

15. The mold gate apparatus of claim 11, wherein the insert coupling further comprises a cylindrical side surface proximal to the primary side surface, wherein the cylindrical side surface is spaced apart from adjacent surfaces of the gate insert during the injection cycle of the injection molding machine.

16. The mold gate apparatus of claim 11, wherein the primary side surface is frustoconical.

17. The mold gate apparatus of claim 11, wherein the distal portion of the nozzle tip comprises an insulator, the insulator including a radially outwardly extending insulator flange, and the insert coupling comprises a distal insert flange directed radially inwardly, wherein the insulator flange is positioned axially immediate the distal insert flange and the proximal portion of the nozzle tip.

* * * * *